United States Patent
Taylor (10) Patent No.: US 8,085,514 B2
(45) Date of Patent: Dec. 27, 2011

(54) MODULAR ON-MACHINE CONTROLLER

(75) Inventor: Brian J. Taylor, Wadsworth, IL (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 954 days.

(21) Appl. No.: 10/718,021

(22) Filed: Nov. 19, 2003

(65) Prior Publication Data

US 2005/0105232 A1 May 19, 2005

(51) Int. Cl.
*H02H 5/04* (2006.01)
*H02H 7/08* (2006.01)
*H02H 7/09* (2006.01)
*H01H 9/30* (2006.01)
*H01H 9/56* (2006.01)
*H01H 73/18* (2006.01)

(52) U.S. Cl. ............... 361/23; 361/24; 361/25; 361/26; 361/27; 361/28; 361/29; 361/30; 361/31; 361/32; 361/33

(58) Field of Classification Search ............... 361/23–34
See application file for complete search history.

(56) References Cited

U.S. PATENT DOCUMENTS

| | | | | |
|---|---|---|---|---|
| 4,769,557 A * | 9/1988 | Houf et al. | ............ | 307/147 |
| 5,557,182 A * | 9/1996 | Hollenbeck et al. | ......... | 318/432 |
| 6,388,563 B1 * | 5/2002 | Brown et al. | ............ | 340/286.02 |
| 6,879,230 B2 * | 4/2005 | Haudry et al. | ............ | 335/132 |
| 2004/0252421 A1 * | 12/2004 | Knox et al. | ............ | 361/23 |

OTHER PUBLICATIONS website: http://www.ecmweb.com/mag/electric_basics_molded_case/index.html.*

* cited by examiner

*Primary Examiner* — Dharti Patel
(74) *Attorney, Agent, or Firm* — Fletcher Yoder P.C.; Alexander R. Kuszewski; John M. Miller (57) ABSTRACT

A modular control assembly is provided for on-machine control of a desired machine. One embodiment has a machine mountable base and a replaceable control unit, wherein the machine mountable base has a machine protection device. In various embodiments of the machine mountable base, the machine protection device may have a short-circuit protective device and a disconnect device. In addition, various embodiments of the replaceable control unit may have a variable frequency drive, a soft start device, or an adjustable overload protection device.

51 Claims, 5 Drawing Sheets

MODULAR ON-MACHINE CONTROLLER

BACKGROUND OF THE INVENTION

The present technique relates generally to control systems, such as machine control systems. More particularly, a unique system and method is provided for modular on-machine control of a machine system or component, such as a motor.

Industrial systems often have a plurality of distributed machine systems or components. Although local controls can be provided for each of these machine systems and components, the high number and variances of necessary controls is generally costly and operationally inefficient. Accordingly, industrial systems generally network the machine systems and components with a centralized control system, thereby reducing costs and improving operational efficiencies. However, local controls remain desirable for certain applications and scenarios, such as monitoring, diagnosing, servicing, adjusting, and generally controlling an individual machine separately from the overall system. For example, a centralized control system may not permit local shutdown, service, adjustment, or control of a particular machine without shutting down the overall system. In most industrial systems, operational continuity affects overall output, timing, and customer satisfaction.

Accordingly, a need exists for an improved control system that addresses one or more of the drawbacks of existing control systems.

SUMMARY OF THE INVENTION

The present technique provides a modular control assembly for on-machine control of a desired machine. One embodiment has a machine mountable base and a replaceable control unit, wherein the machine mountable base has a machine protection device. In various embodiments of the machine mountable base, the machine protection device may have a short-circuit protective device and a disconnect device. In addition, various embodiments of the replaceable control unit may have a variable frequency drive, a soft start device, or an adjustable overload protection device.

BRIEF DESCRIPTION OF THE DRAWINGS

The foregoing and other advantages and features of the invention will become apparent upon reading the following detailed description and upon reference to the drawings in which.

DETAILED DESCRIPTION OF SPECIFIC EMBODIMENTS

Figure 1:
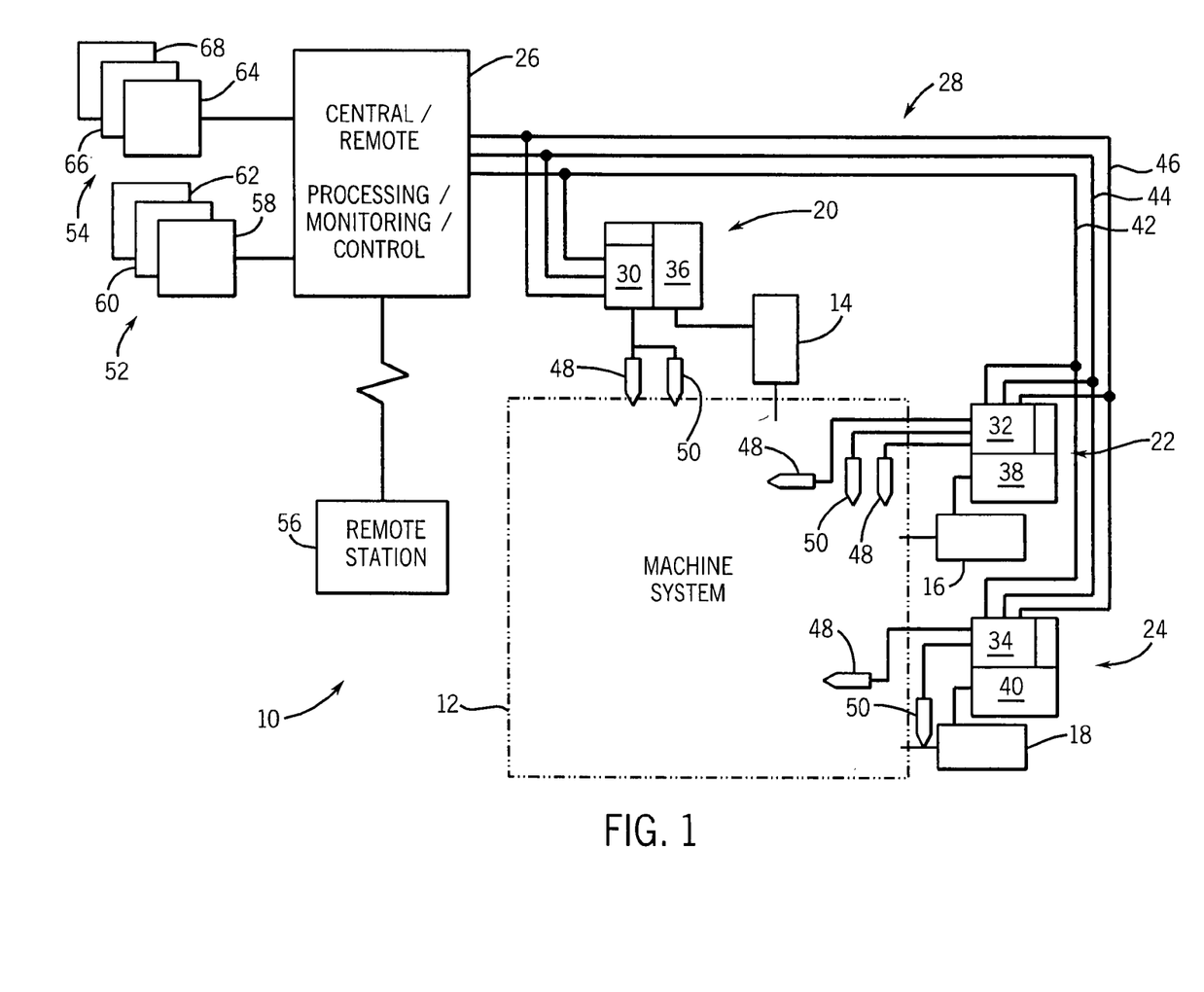
FIG. 1 is a block diagram illustrating an exemplary system in accordance with certain embodiments of the present technique.

Turning to the figures, FIG. 1 is a diagram illustrating an exemplary system in accordance with certain embodiments of the present technique. As discussed in further detail below, the system 10 may comprise a variety of applications and machinery. For example, the system 10 may comprise one or more commercial or industrial applications, such as manufacturing, processing, distributing, material handling, mining, petrochemical processing, and transportation. Moreover, these applications may entail a variety of products, such as food, beverages, clothing, consumer products, automotive, marine, aircraft (e.g., airport baggage), water, sewage and waste products, petroleum, and so forth. The actual machinery and components employed in the system 10 may comprise one or more motors, pumps, compressors, heating devices, cooling devices, gearing mechanisms, conveyors, robotics, overhead carriers, manufacturing devices (e.g., machining devices), sorting mechanisms, labeling mechanisms, sensors, actuators, solenoids, valves, magnetic starters, relays, and so forth. Accordingly, although specific embodiments are described in further detail below, the present techniques are intended for use in a variety of contexts.

As illustrated, the system 10 comprises a machine system 12 having a plurality of motors or machines 14, 16, and 18. In turn, the machines 14, 16, and 18 comprise on-machine controllers 20, 22, and 24, which are coupled to a central/remote system 26 via a power and data distribution system 28. As discussed in further detail below, each of these on-machine controllers 20, 22, and 24 comprise uniquely selected pairs of modular machine protection bases 30, 32, and 34 and modular control units 36, 38, and 40, respectively. In a preferred embodiment, the modular machine protection bases 30, 32, and 34 are replaceable and selectable from a unique group of modular bases, each of which is suitable for certain motors or machines. Similarly, the modular control units 36, 38, and 40 are replaceable and selectable from a unique group of modular control units, each of which is suitable for certain motors or machines and certain modular bases. In this manner, different selectable combinations of modular bases and control units from these groups can provide desired machine protection and control functionality, which is suitable for the particular motor or machine. For example, in some applications each of the motors or machines may have the same modular motor protection base with different modular control units, while other applications may have different modular basis with one or more different modular control units. Accordingly, as the following discussion proceeds, it should be noted that the modular machine protection bases 30, 32, and 34 may correspond to identical or different bases, which can be selectively replaced with other modular bases from the unique group of modular bases. Similarly, the modular control units 36, 38, and 40 may correspond to identical or different control units, which can be selectively replaced with other modular control units from the unique group of modular control units.

In operation, the on-machine controllers 20, 22, and 24 are engageable locally or remotely to monitor, process, diagnose, service, or generally control the respective motors are machines 14, 16, 18. Moreover, the illustrated central/remote system 26 may comprise a variety of hardware and software adapted for monitoring, processing, diagnosing, or generally controlling the system 10. The illustrated system 28 comprises a plurality of data and power lines, such as lines 42, 44, and 46. Using the on-machine controllers 20, 22, and 24 and/or the central/remote system 26, these lines 42, 44, and 46 facilitate operation and cooperation of the machine system 12, the motors or machines 14, 16, and 18, and a variety of input/output devices, such as sensors 48 and actuators 50.

In addition, the central/remote system 26 and/or the power and data distribution system 28 may be coupled to a variety of other local and remote machine systems or facilities, such as local facilities 52 and 54 and remote station 56. For example, the local facility 52 may have machine systems 58, 60, and 62, while the local facility 54 has machine systems 64, 66, and 68. Again, these machine systems 58 through 68 may have one or more on-machine controllers 20, 22, and 24 having modular machine protection bases 30, 32, 34 and modular control units 36, 38, and 40, as described in further detail below.

Regarding the wiring arrangement of the illustrated system 10, the modular control units 36, 38, and 40 are coupled to the motors or machines 14, 16, and 18, while the modular motor protection bases 30, 32, and 34 are coupled to the power and data distribution system 28. In certain embodiments, the lines 42, 44, and 46 may comprise a single phase or multiphase alternating current (AC) power supply line, a direct current (DC) power supply line, and a suitable data communication line. For example, the power and data distribution system 28 may distribute a three-phase 480 Volt AC power supply to one or more of the motors or machines 14, 16, and 18. In addition, the power and a distribution system 28 may distribute a different power supply, such as a single phase 110 Volt AC or a 24 Volt DC power supply, to one or more of the sensors 30 and actuators 32. It also should be noted that the illustrated power and data distribution system 28 may comprise a variety of distributed machine networks, circuitry, and protocols, such as DeviceNet, DeviceLogix, ControlNet, and ControlLogix provided by Rockwell Automation, Inc. of Milwaukee, Wis.

Figure 2:
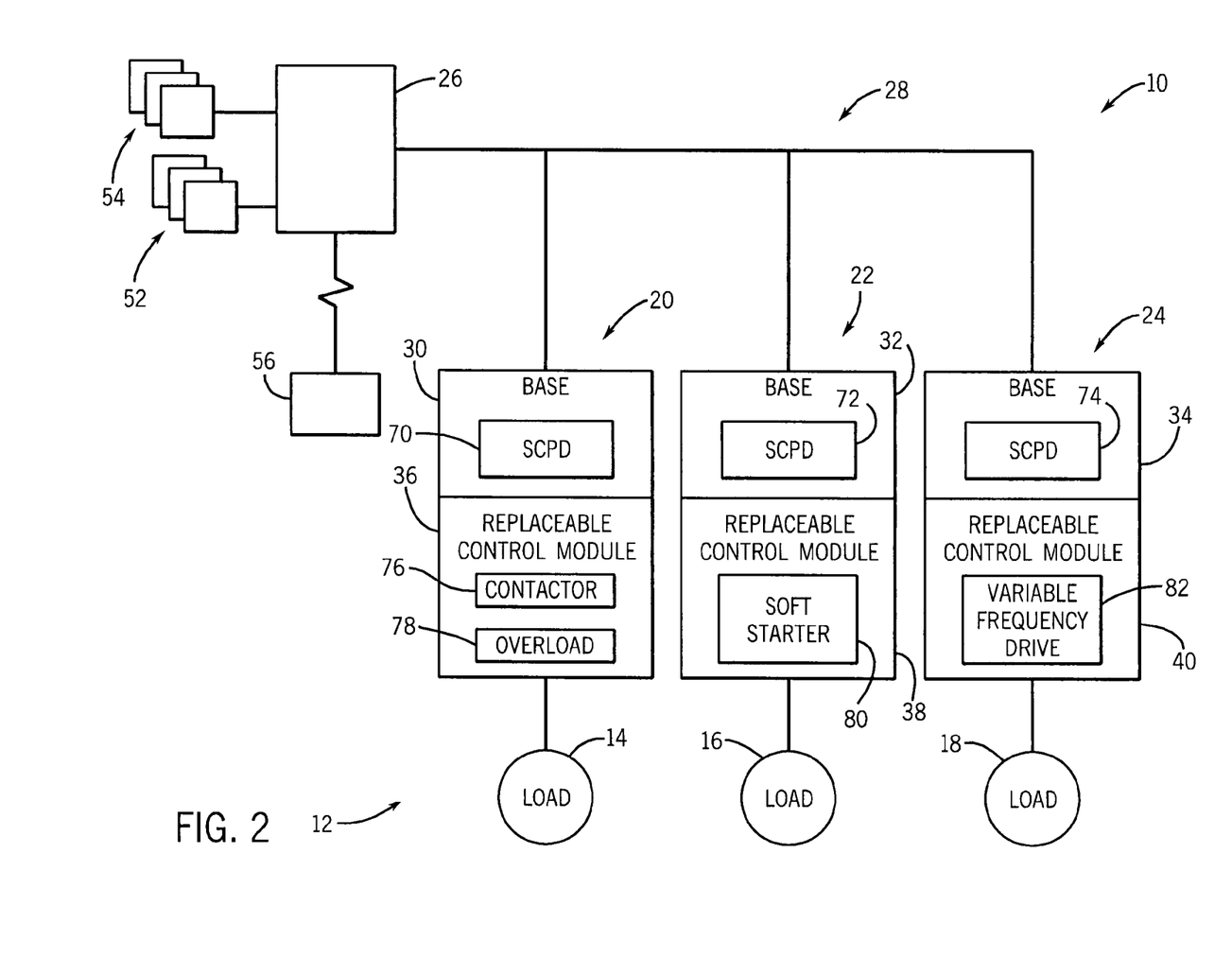
FIG. 2 is a block diagram illustrating an exemplary system of on-machine controllers in accordance with certain embodiments of the present technique.

Turning to the next figure, FIG. 2 is a block diagram of the system 10 illustrating further details of the on-machine controllers 20, 22, and 24. As illustrated, the modular machine protection bases 30, 32, and 34 comprise short-circuit protective devices (SCPD) 70, 72, and 74, respectively. As discussed in further detail below, these short-circuit protective devices 70, 72, 74 may comprise a variety of machine/motor protective circuitry, electromechanical devices, and/or software to protect the motors or machines 14, 16, and 18, respectively. As mentioned above, the particular modular machine protection bases 30, 32, 34 may be selected based on a variety of selection criteria, such as load, application, controllable functions, and other characteristics of the motors or machines 14, 16, and 18. For example, the machines 14, 16, and 18 may comprise motors of different horse power (HP) ratings, such as 5 HP, 10 HP, and 25 HP, respectively. In addition, the selection criteria can include functionality or cooperative operability with features of the modular control units 36, 38, and 40.

In certain embodiments of the modular machine protection bases 30, 32, and 34, the short-circuit protective devices 70, 72, and 74 may comprise a circuit breaker, such as a magnetically tripping circuit breaker or a bimetallic strip circuit breaker. Other suitable instantaneously tripping circuit breaker also may be used within the scope of the present technique. In addition, the short-circuit protective devices 70, 72, and 74 may comprise a local disconnect or machine isolation device, such as a rotary disconnect switch. Accordingly, the short-circuit protective devices 70, 72, and 74 may provide automatic/instantaneous protection and local/manual power control of the respective motors or machines 14, 16, and 18.

As further illustrated in FIG. 2, the replaceable control modules or modular control units 36, 38, and 40 each comprise different control features and components, which are selectively replaceable from a group of modular control units. Again, the particular modular control units 36, 38, and 40 may be selected based on a variety of selection criteria, such as load, application, controllable functions, and other characteristics of the motors or machines 14, 16, and 18. In addition, the selection criteria can include functionality or cooperative operability with features of the modular machine protection bases 30, 32, and 34.

Turning to the illustrated embodiments of the modular control units, the modular control unit 36 comprises a contactor 76 and an overload protection device 78. For example, the contactor 76 may comprise an electromechanical or magnetic contactor, and the overload protection device 78 may comprise an electromechanical or electronic overload protection device. Moreover, the overload protection device 78 may be adjustable or programmable (e.g., locally or remotely), such that the overload protection enhances and cooperates with the motor protection provided by the short-circuit protective device 20 of the modular motor protection base 30.

At the motor or machine 16, the modular control unit 38 comprises a soft starter 80, such as a soft start motor drive or controller. As appreciated by those skilled in the art of machine controls, a soft starter gradually ramps the motor or machine 16 to the desired operating condition over a desired time period. For example, a soft start motor drive may provide the motor with an initial voltage or torque value, such as an adjustable value between 0 and 70% or between 5 and 90% of the locked rotor torque. The soft start motor drive then gradually increases the motor voltage over an acceleration ramp time. Again, the acceleration ramp time may be an adjustable time, such as between 2 and 30 seconds. The soft starter 80 also may have a selectable kickstart or boost, such as between 0 and 500% of full load current, to provide the machine with additional torque at startup.

At the motor or machine 18, the modular control unit 40 comprises a variable speed or variables frequency drive 82, which may have a variety of circuitry to provide a variable frequency AC output for the motor or machine 18. As appreciated by those skilled in the art of machine controls, the variable drive 82 may include an inverter drive having an array of solid-state switches, such as insulated gate bipolar transistors, which are switched at high frequency to provide the desired variable AC output.

Figure 3:
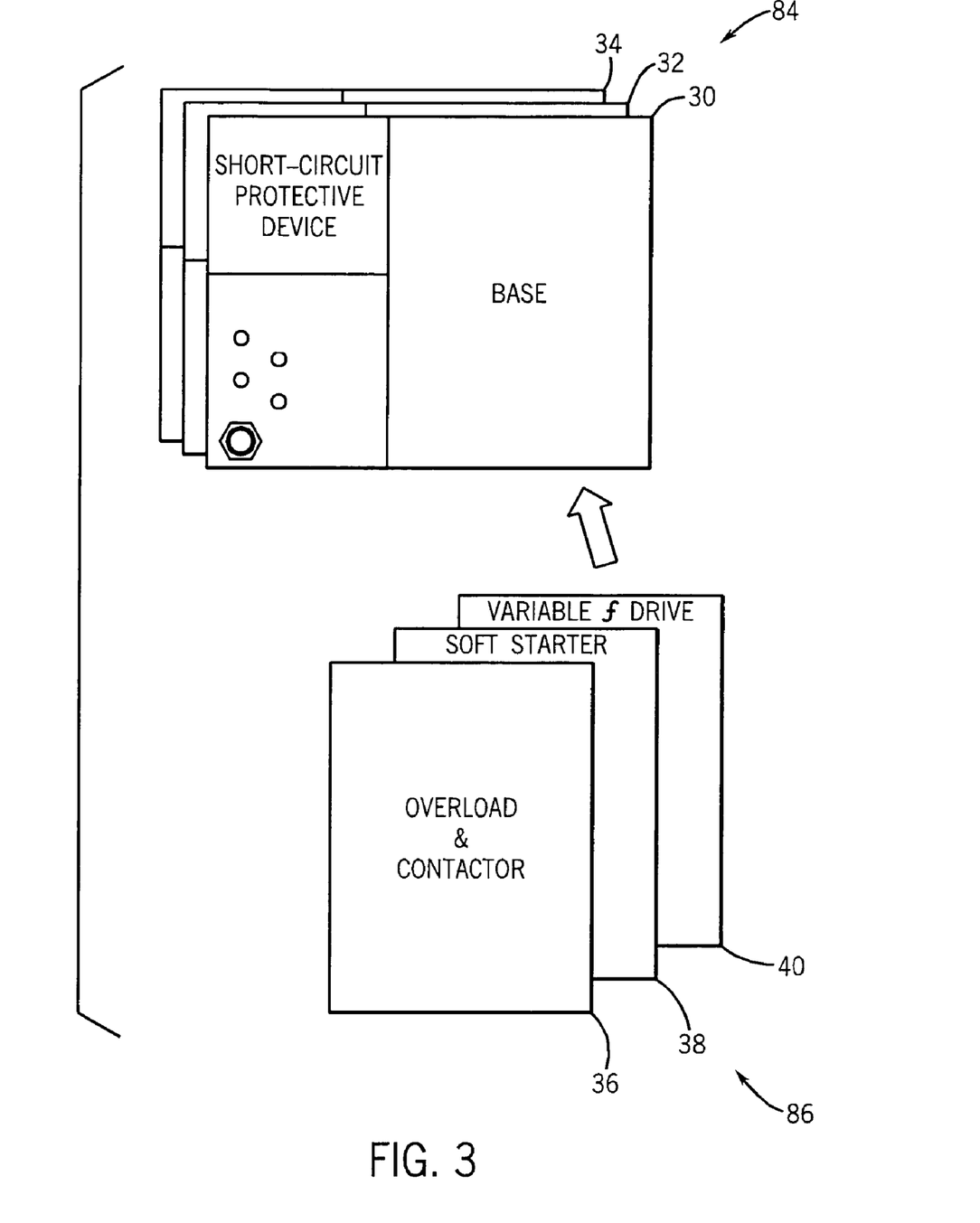
FIG. 3 is a block diagram illustrating exemplary modular bases and modular control units of an on-machine controller in accordance with certain embodiments of the present technique.

Again, as discussed above, the modularity of the motor protection bases 30, 32, and 34 and the control units 36, 38, and 40 facilitate selectable and reconfigurable combinations of machine protection and control, which are applicable to a broad range of motors or machines. Turning to the next figure, FIG. 3 is a block diagram illustrating a unique group of selectable modular bases 84 and a unique group of selectable control modules 86, which can be selectively paired in any suitable combination to provide the desired protection and control of a particular motor or machine. In this exemplary embodiment, the group of selectable modular bases 84 comprises the modular machine protection bases 30, 32, and 34, and the group of selectable control modules 86 comprises the modular control units 36, 38, and 40. Accordingly, one of the modular machine protection bases 30, 32, and 34 can be selected from the group 84 and mounted onto the desired motor or machine, such as one of the machines 14, 16, or 18. Similarly, one of the modular control units 36, 38, and 40 can be selected from the group 86 and replaceably mounted onto the selected one of the bases 30, 32, or 34. At any time, the selectively mounted bases and control units can be exchanged with other ones from the groups 84 and 86.

Figure 4:
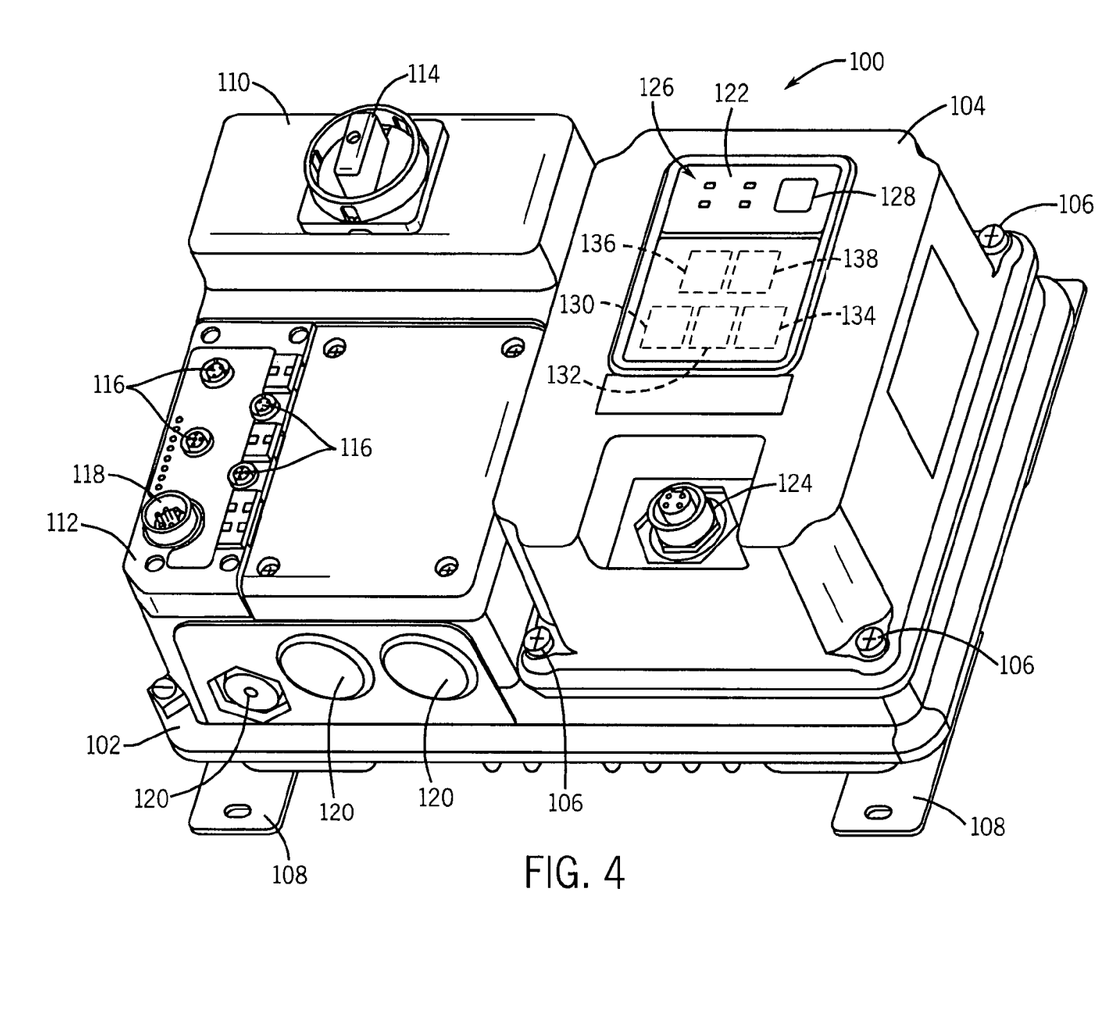
FIG. 4 is a perspective view of an exemplary on-machine controller in accordance with certain embodiments of the present technique.

FIG. 4 is a perspective view of an exemplary on-machine controller 100 in accordance with certain embodiments of the present technique. For example, the illustrated on-machine controller 100 may comprise any one of the combinations selectable from the groups 84 and 86 illustrated in FIG. 3. As illustrated, the on-machine controller 100 comprises a machine mountable base 102 and a modular/replaceable control unit 104, which is removably mounted to the machine mountable base 102 via fasteners 106. In turn, the machine mountable base 102 may be coupled to the desired motor or machine via mounting feet 108 or other suitable threaded fasteners, latches, hooks, and so forth.

Turning first to the machine mountable base 102, the illustrated embodiment comprises a motor protection device 110 and a wiring panel 112. The motor protection device 110 may comprise a short-circuit protective device (SCPD), such as a magnetically tripping circuit breaker or a bimetallic strip circuit breaker. Other suitable instantaneously tripping circuit breaker also may be used within the scope of the present technique. The illustrated motor protection device 100 also comprises a local disconnect or machine isolation device 114, e.g., a rotary disconnect switch. In operation, the motor protection device 110 may provide automatic/instantaneous protection and/or local/manual power control of the respective motors or machines.

On the wiring panel 112, the machine mountable base 102 comprises a plurality of multi-pin interconnections or input/output interfaces, such as device interfaces 116 and a network interface 118. For example, the device interfaces 116 may comprise communication interfaces for sensors, actuators, relays, solenoids, and other remote circuitry. Embodiments of the network interface 118 may comprise a power and data distribution system for transmitting and receiving power, signals, status data, error logs, and various control data. For example, the network interface 118 may be configured for a variety of distributed machine networks, circuitry, and protocols, such as DeviceNet, DeviceLogix, ControlNet, and ControlLogix provided by Rockwell Automation, Inc. of Milwaukee, Wis. Adjacent the wiring panel 112, the machine mountable base 102 also may comprise one or more conduit receptacles 120, which may be opened to accommodate a desired conduit or wiring assembly.

Regarding the modular control unit 104, the illustrated embodiment comprises a user interface or control panel 122 and a multi-pin output connector or machine interface 124. As illustrated, the control panel 122 comprises a plurality of indicators 126 and a control button 128. To facilitate diagnostics and troubleshooting, the indicators 126 may comprise a power indicator, a run indicator, a network indicator, a fault indicator, or any other suitable monitoring or diagnostic indicator. Moreover, the control button 128 may comprise a reset button to facilitate quick resetting and restarting of the local motor or machine. Certain embodiments of the control panel 122 also may comprise a manual control or hand button 130, an automatic control or auto button 132, an off button 134, a forward drive control button 136, or a reverse drive control button 138. In addition, the modular control unit 104 may comprise a variety of internal control circuitry, such as an across the line starter, a soft starter, a variable frequency drive, a programmable electronic overload, a contactor, or any other desired features for machine protection and control.

Figure 5:
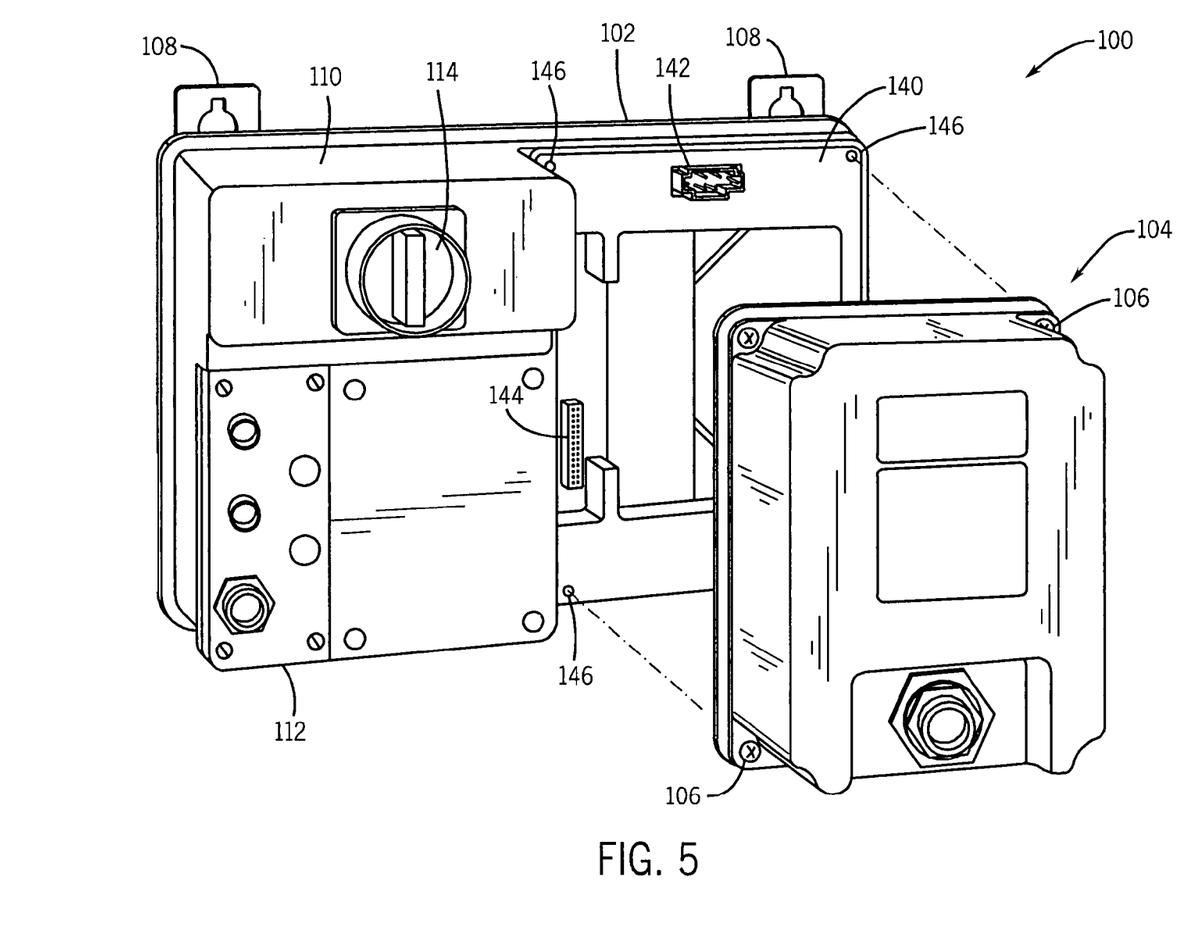
FIG. 5 is an exploded perspective view of the on-machine controller of FIG. 4 in accordance with certain embodiments of the present technique.

FIG. 5 is an exploded view of the on-machine controller 100 illustrated in FIG. 4. As illustrated, the modular control unit 102 is exploded from a modular mounting receptacle 140 on the machine mountable base 102. In the modular mounting receptacle 140, the machine mountable base 102 comprises a variety of electrical and mechanical connectors, such as multi-pin connectors 142 and 144 and fastening receptacles 146. In assembly, the multi-pin connectors 142 and 144 connect with mating connectors on the modular control unit 104 to facilitate power and/or data communication between the machine mountable base 102 and the modular control unit 104. As discussed above, the machine protection and control devices disposed within these modular components 102 and 104 may be cooperative to provide a unique system of protection and control for the desired motor or machine. Again, either one of the machine mountable base 102 or the modular control unit 104 can be selectively replaced or exchanged with another modular unit with desired protection and control features. In this manner, the modularity of the on-machine controller 100 facilitates the reduction of inventory of on-machine controllers, while providing flexibility in the field to accommodate different applications.

While the invention may be susceptible to various modifications and alternative forms, specific embodiments have been shown in the drawings and have been described in detail herein by way of example only. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A controller for a machine, comprising:
a machine mountable base comprising a motor protection device housed in the base and a network terminal configured to connect the base to a central or remote system via a power and data distribution structure; and
a modular control unit replaceably mountable to the machine mountable base, wherein the modular control unit is coupled electrically downstream of the motor protection device and comprises control circuitry configured to be coupled electrically upstream of a motor of the machine and to control the motor in operation;
wherein the motor protection device is electrically connected between a power source and the modular control unit, and the modular control unit is electrically connected between the motor protection device and the motor to control application of power from the power source received through the motor protection device to the motor.

2. The controller of claim 1, wherein the motor protection device comprises a short-circuit protective device.

3. The controller of claim 2, wherein the short-circuit protective device comprises an instantaneous trip.

4. The controller of claim 2, wherein the short-circuit protective device comprises a magnetic circuit breaker.

5. The controller of claim 1, wherein the motor protection device comprises a disconnect device.

6. The controller of claim 5, wherein the disconnect device comprises a local lockout.

7. The controller of claim 1, wherein the modular control unit comprises an overload protection device and a contactor.

8. The controller of claim 1, wherein the modular control unit comprises a programmable electronic overload.

9. The controller of claim 1, wherein the modular control unit comprises an electromagnetic contactor.

10. The controller of claim 1, wherein the modular control unit comprises a soft start machine controller.

11. The controller of claim 1, wherein the modular control unit comprises a variable frequency machine drive.

12. The controller of claim 1, wherein the machine mountable base comprises at least one sensor terminal.

13. The controller of claim 1, wherein the machine mountable base comprises at least one actuator terminal.

14. The controller of claim 1, wherein the modular control unit is selected from and interchangeable with a plurality of modular control units, each having different control circuitry.

15. A motor controller, comprising:
a motor mountable base comprising a short-circuit tripping disconnect; and a replaceable control unit removably coupled to the motor mountable base, wherein the replaceable control unit is coupled electrically downstream of the short circuit tripping disconnect and comprises control circuitry configured to be coupled electrically upstream of a motor and to control the motor in operation;

wherein the short-circuit tripping disconnect is electrically connected between a power source and the replaceable control unit, and the replaceable control unit is electrically connected between the short-circuit tripping disconnect and the motor to control application of power from the power source received through the short-circuit tripping disconnect to the motor.

16. The motor controller of claim 15, wherein the short-circuit tripping disconnect comprises a magnetically tripping disconnect.

17. The motor controller of claim 15, wherein the short-circuit tripping disconnect comprises a disconnect lockout.

18. The motor controller of claim 15, wherein the motor mountable base comprises at least one communication terminal.

19. The motor controller of claim 18, wherein the at least one communication terminal comprises a machine network terminal adapter to facilitate networking of a plurality of machine components.

20. The motor controller of claim 15, wherein the replaceable control unit comprises an adjustable overload and a contactor.

21. The motor controller of claim 15, wherein the replaceable control unit comprises a soft start motor controller.

22. The motor controller of claim 15, wherein the replaceable control unit comprises a variable frequency motor drive.

23. The motor controller of claim 15, wherein the replaceable control unit comprises at least one monitoring device.

24. The motor controller of claim 15, wherein the replaceable control unit comprises at least one diagnostic device.

25. The motor controller of claim 15, wherein the replaceable control unit comprises at least one manual control mechanism.

26. The motor controller of claim 15, wherein the replaceable control unit is selected from and interchangeable with a plurality of replaceable control units, each having different control circuitry.

27. A controller for a machine system, comprising:
an on-machine base comprising a machine protection device; and
a control unit coupled electrically downstream of the machine protection device and comprising control circuitry configured to be coupled electrically upstream of a motor of at least one machine in the machine system and control the motor in operation, wherein the control unit is selectable from a plurality of different types of control units having different types of control circuitry, the control unit is replaceably mountable to the on-on-machine base, and the on-machine base and the control unit are cooperative to provide desired on-machine controllability;
wherein the machine protection device is electrically connected between a power source and the control unit, and the control unit is electrically connected between the machine protection device and the motor to control application of power from the power source received through the machine protection device to the motor.

28. The controller of claim 27, wherein the machine protection device comprises a magnetically tripping disconnect.

29. The controller of claim 27, wherein the control unit is selected from a group consisting of a soft start machine controller, a variable frequency machine drive, and an overload protection device.

30. The controller of claim 27, wherein the control unit comprises an output connector configured to couple with the motor of the at least one machine via a cable.

31. The controller of claim 27, wherein the machine protection device comprises a short-circuit protective device housed in the on-machine base.

32. A controller for a system of distributed machines, comprising:
a machine mountable base, comprising:
a short-circuit protective device; and
a disconnect device; and
a modular control unit coupled electrically downstream of the short-circuit protective device and replaceably mountable to the machine mountable base, wherein the modular control unit comprises control circuitry configured to be coupled electrically upstream of a motor of at least one machine in the system of distributed machines and to control the motor in operation;
wherein the short-circuit protective device is electrically connected between a power source and the modular control unit, and the modular control unit is electrically connected between the short-circuit protective device and the motor to control application of power from the power source received through the short-circuit protective device to the motor.

33. The controller of claim 32, wherein the short-circuit protection device comprises an instantaneous trip.

34. The controller of claim 32, wherein the short-circuit protection device comprises a magnetic circuit breaker.

35. The controller of claim 32, wherein the short-circuit protection device and the disconnect device are replaceably mountable to the machine mountable base.

36. The controller of claim 32, wherein the control circuitry comprises a variable frequency drive.

37. The controller of claim 32, wherein the control circuitry comprises a soft-start machine controller.

38. The controller of claim 32, wherein the control circuitry comprises an overload device and a contactor.

39. The controller of claim 32, wherein the modular control unit comprises a motor connection terminal.

40. The controller of claim 32, wherein the machine mountable base comprises a network terminal.

41. The controller of claim 32, wherein the machine mountable base comprises at least one sensor terminal.

42. The controller of claim 32, wherein the machine mountable base comprises at least one actuator terminal.

43. The controller of claim 32, wherein the modular control unit comprises an output connector configured to couple with the at least one machine via a cable.

44. The controller of claim 32, wherein the modular control unit is selected from and interchangeable with a plurality of modular control units, each having different control circuitry.

45. The controller of claim 32, wherein the on-machine motor protection base comprises a short-circuit protective device housed therein.

46. A machine, comprising:
a motor;
a motor controller mounted to the motor, comprising:
a modular base comprising motor protection circuitry; and
a modular motor control unit coupled to the modular base electrically downstream of the motor protection circuitry and comprising motor control circuitry configured to be coupled electrically upstream of the motor, wherein the motor control circuitry is cooperatively operable with the motor protection circuitry, the modular motor control unit being selectively replaceable from a plurality of different types of motor control units, wherein the motor protection circuitry is electrically connected between a power source and the modular motor control unit, and the modular motor control unit is electrically connected between the motor protection circuitry and the motor to control application of power from the power source received through the motor protection circuitry to the motor; and a connector coupling the modular motor control unit directly to the motor to enable control of the motor by the modular motor control unit.

47. The machine of claim 46, wherein the motor protection circuitry comprises a short-circuit protective device housed in the modular base.

48. A controller for a machine system, comprising:
a modular control unit, comprising:
control circuitry configured to directly control a motor of a machine;
a first connector configured to couple with an on-machine motor protection base to enable cooperative operability of the control circuitry with motor protection circuitry of the on-machine motor-protection base, the modular control unit being disposed electrically downstream of the motor protection circuitry and electrically upstream of the motor; and
a second connector configured to couple with the motor of the machine to enable control of the machine by the modular control unit;
wherein the modular control unit is selected from and interchangeable with a plurality of modular control units each having different control circuitry, and wherein the modular control unit is electrically connected between the motor protection circuitry and the motor to control application of power from a power source received through the motor protection circuitry to the motor.

49. The controller of claim 48, wherein the second connector comprises an external cable receptacle disposed on an external surface of the modular control unit while the modular control unit is coupled to the on-machine motor protection base.

50. The controller of claim 48, wherein the first and second connectors are disposed on opposite sides of the modular control unit.

51. The controller of claim 48, wherein the modular control unit comprises a user interface, and both the user interface and the second connector are externally accessible while the modular control unit is coupled to the on-machine motor protection base.

* * * * *